June 12, 1928.
C. A. UPDEGRAVE ET AL
1,673,722
WINDSHIELD ATTACHMENT
Filed March 16, 1927
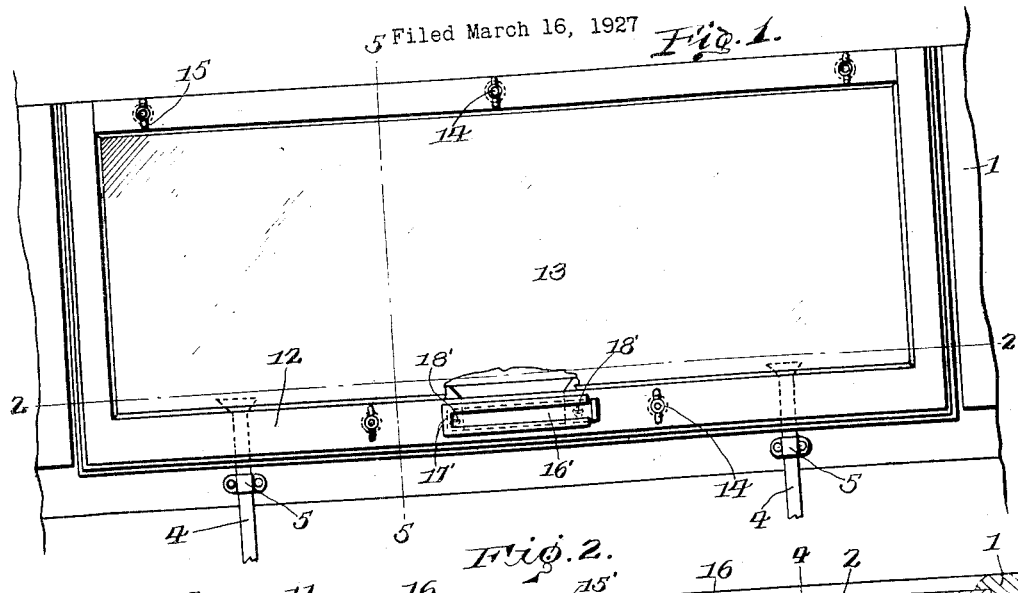
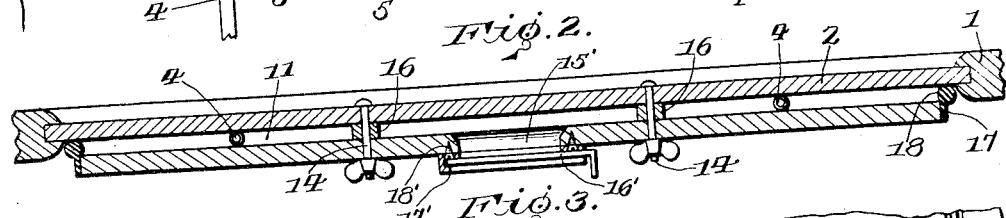
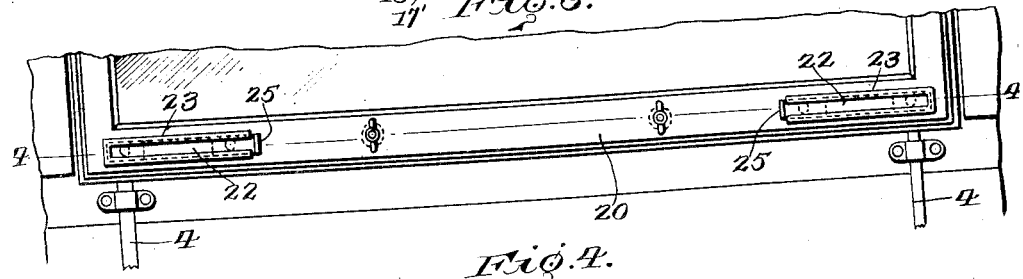
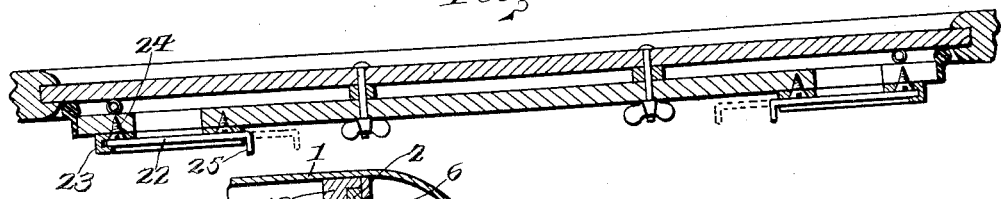
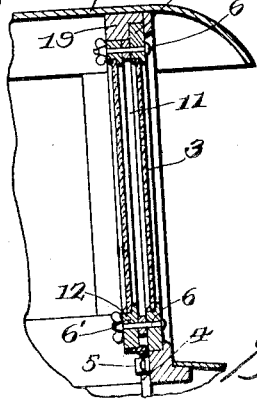
INVENTOR.
Clarence A. Updegrave
Warren R. Shollenberger
BY
Geo. P. Kimmel. ATTORNEY.

Patented June 12, 1928.

1,673,722

UNITED STATES PATENT OFFICE.

CLARENCE A. UPDEGRAVE, OF ORWIGSBURG, AND WARREN R. SHOLLENBERGER, OF SCHUYLKILL HAVEN, PENNSYLVANIA, ASSIGNORS OF TWENTY PER CENT TO WILLET BOYER, OF POTTSVILLE, PENNSYLVANIA.

WINDSHIELD ATTACHMENT.

Application filed March 16, 1927. Serial No. 175,772.

This invention relates to an attachment for wind shields, and has for its object to provide, in a manner as hereinafter set forth, means secured with and coacting with the wind shield to provide a chamber for the reception of heated air for the purpose of maintaining the windshield, as well as the attachment, at a temperature to prevent accumulation of frost and moisture thereon thereby enabling the driver of the vehicle to have a clear vision during the travel of the latter, under such conditions reducing possibility of accidents and collisions to a minimum. The wind shield attachment in accordance with this invention, is designed primarily for use in connection with an air heating and supplying attachment similar to that disclosed in our application filed February 3, 1927, Serial No. 165,708, but it is to be understood that the attachment, in accordance with this invention can be used in connection with any heated air supply means with which it is applicable.

A further object of the invention is to provide, in a manner as hereinafter set forth, an attachment of the class referred to constructed and arranged to prevent the accumulation of frost and moisture on the wind shield and further for discharging the heated fresh air from the wind shield into the car to provide a comfortable temperature therein.

Further objects of the invention are to provide, in a manner as hereinafter set forth, a wind shield attachment which is comparatively simple in its construction and arrangement, strong, durable, compact, thoroughly efficient in its use, readily installed with respect to the wind shield and comparatively inexpensive to set up.

With the foregoing and other objects in view the invention consists of the novel construction, combination and arrangement of parts as hereinafter more specifically described and illustrated in the accompanying drawings wherein are shown embodiments of the invention, but it is to be understood that changes, variations and modifications can be resorted to which fall within the scope of the claims hereunto appended.

In the drawings wherein like reference characters denote corresponding parts throughout the several views:

Figure 1 is a rear elevation of an attachment, in accordance with this invention, and with the same secured to a wind shield of a motor vehicle.

Figure 2 is a section on line 2—2 Figure 1.

Figure 3 is a fragmentary view in rear elevation of a modified form of attachment in accordance with this invention and further illustrating the same connected to the wind shield of the vehicle.

Figure 4 is a section on line 4—4 Figure 3.

Figure 5 is a vertical sectional view on line 5—5 Figure 1 and further illustrating the wind shield and attachment secured in position with respect to the front of an automobile body.

Referring to the drawings in detail 1 denotes the body portion of an automobile, that is to say the front part thereof and to which is connected a wind shield consisting of a frame 2 provided with a transparent panel 3, such as a sheet of glass. Leading to the wind shield are heated air supply pipes 4 secured in position by keepers. The pipes 4 communicate with any suitable form of air heating means. The frame 2 of the wind shield is provided with openings 6 for a purpose to be presently referred to.

With reference to Figures 1 and 2 the attachment is illustrated as positioned to oppose the rear face of the wind shield to provide in connection with the latter a heated air receiving chamber 11 into which the heated air from the pipes 4 is discharged. The attachment includes a frame 12 of the same contour as the wind shield frame 2 and such frame 12 carries a transparent member 13 of the same size as the wind shield glass 3. The frame 12 is positioned rearwardly with respect to the wind shield frame 2 and is fixedly secured to the top and bottom of the latter by a series of spaced bolts 14, carrying wing nuts 15. Mounted on the bolts 14 and interposed between the frame 12 and wind shield frame 2 are resilient spacing members or collars 16. The bolts 14 extend through the openings 6 formed in the frame 2 of the wind shield and also through openings 6' formed in the frame 12. The bolts 14 are arranged at the top and bottom of the frame 12 and wind shield frame 2. The frame 12 has secured to the end and bottom edges thereof a strip of resilient material 17 and which is co-extensive with such edges. The strip 17 projects forwardly of the frame 12 and has the forwardly projecting portion thereof enlarged, as at 18 which abuts against the transparent panel 3 of the windshield and provides the bottom wall and end walls of the chamber 11. The strip 17 further provides what may be termed a resilient sealing means between the opposed faces of the frame 12 and wind shield frame 2. The top of the frame 12 abuts against the cross support 19 for the top of the wind shield frame 2. The wing nuts 15 provide means for tightly clamping, in connection with the collars 16 and strip 17, the frame 12 to and rearwardly of the wind shield frame 2. The bottom rail of the frame 12, is provided centrally thereof with a heated air outlet 15' for the chamber 11 and which is controlled by a slide valve 16' carried by a casing 17', secured by the holdfast devices 18' to the outer face of said bottom rail.

The modified form of attachment shown in Figures 3 and 4 is the same as that illustrated by Figures 1 and 2 with this exception that the bottom rail of the frame 12, which is indicated at 20, is formed with a pair of heated air outlets 21 for the chamber 11, instead of the central outlet 15' and which are controlled by ventilating slides or valves 22, carried by casings 23, secured to the rear face of the bottom rail 20 by holdfast devices 24. The slides 22 which normally close the openings 21, are oppositely disposed with respect to each other and each is formed with an angularly disposed end 25 to facilitate the shifting of the slide when desired.

The outlets 15' and 21 are provided so that the heated air from the chamber 11 can be discharged into the interior of the automobile for heating the car.

It is thought the many advantages of a wind shield attachment, in accordance with this invention, can be readily understood, particularly as it provides for the maintaining of the wind shield at a temperature to prevent accumulation of frost and moisture thereon thereby enabling the driver of the vehicle to have a clear vision during the travel of the latter, and although the preferred embodiments of the invention are as illustrated and described, yet it is to be understood that changes in the details of construction can be had which will fall within the scope of the invention as claimed.

What we claim is:—

1. An attachment for windshields of that type including a frame carrying a transparent panel, the combination of a frame element of less length than the length of the windshield frame and having its top and bottom rails opposing the top and bottom rails of the windshield frame at the rear thereof, a transparent element carried by said frame element and adapted to oppose said panel to provide a chamber for the reception of heated air, spacing means between said rails of the windshield and the said rails of said frame element, means extending through said spacing means for connecting said frame element to said rails of the windshield, and sealing means projecting forwardly from the end and bottom rails of the frame element and adapted to abut against said panel and bottom rail of the windshield to seal said chamber.

2. An attachment for windshields of that type including a frame carrying a transparent panel, the combination of a frame element of less length than the length of the windshield frame and having its top and bottom rails opposing the top and bottom rails of the windshield frame at the rear thereof, a transparent element carried by said frame element and adapted to oppose said panel to provide a chamber for the reception of heated air, spacing means between said rails of the windshield and the said rails of said frame element, means extending through said spacing means for connecting said frame element to said rails of the windshield, and sealing means projecting forwardly from the end and bottom rails of the frame element and adapted to abut against said panel and bottom rail of the windshield to seal said chamber, said spacing and sealing means being resilient and compressed by the means for connecting the frame element to the windshield frame.

3. An attachment for windshields of that type including a frame carrying a transparent panel, the combination of a frame element of less length than the length of the windshield frame and having its top and bottom rails opposing the top and bottom rails of the windshield frame at the rear thereof, a transparent element carried by said frame element and adapted to oppose said panel to provide a chamber for the reception of heated air, spacing means between said rails of the windshield and the said rails of said frame element, means extending through said spacing means for connecting said frame element to said rails of the windshield, and sealing means projecting forwardly from the end and bottom rails of the frame element and adapted to abut against said panel and bottom rail of the windshield to seal said chamber, the vertical cross sectional area of said chamber being greater than the vertical cross sectional area of said panel.

4. An attachment for windshields of that type including a frame carrying a transparent panel, the combination of a frame element of less length than the length of the windshield frame and having its top and bottom rails opposing the top and bottom rails of the windshield frame at the rear thereof, a transparent element carried by said frame element and adapted to oppose said panel to provide a chamber for the reception of heated air, spacing means between said rails of the windshield and the said rails of said frame element, means extending through said spacing means for connecting said frame element to said rails of the windshield, sealing means projecting forwardly from the end and bottom rails of the frame element and adapted to abut against said panel and bottom rail of the windshield to seal said chamber, and means carried by one of the rails of said frame element for controlling discharge from said chamber.

5. An attachment for the purpose set forth, comprising in combination a windshield including a frame carrying a transparent panel, a frame element of less length than the length of the windshield frame and having its top and bottom rails opposing and spaced from the top and bottom rails of the windshield frame, a transparent element carried by said frame element and adapted to be arranged in opposed spaced relation with respect to said panel to provide a chamber for the reception of heated air, spacing means between the said rails of the frame of the windshield and the said rails of said frame element, said spacing means arranged in spaced relation and being resilient, means extending through said spacing means and through the said rails of the frame of the windshield and said rails of the frame element for connecting said rails together, and sealing means secured to the outer edges of the end and bottom rails of the frame element and abutting against said panel of the bottom rail of the windshield for sealing the end and bottom of said chamber.

In testimony whereof, we affix our signatures hereto.

CLARENCE A. UPDEGRAVE.
WARREN R. SHOLLENBERGER.